UNITED STATES PATENT OFFICE.

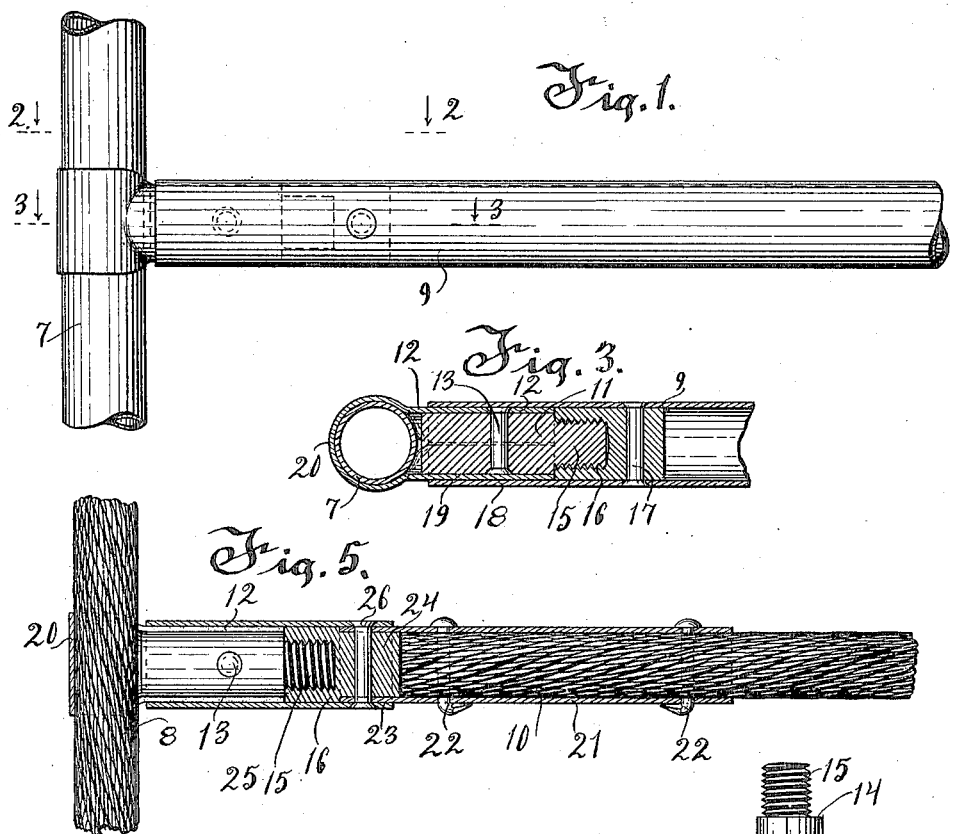
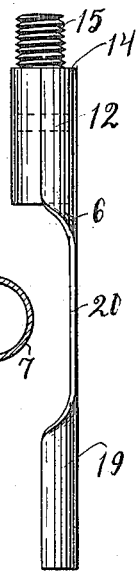

JULIUS F. GOETZ, OF HARTFORD, WISCONSIN.

LIGHTNING-ROD.

1,162,855.

Specification of Letters Patent.

Patented Dec. 7, 1915.

Application filed January 25, 1915. Serial No. 4,129.

*To all whom it may concern:*

Be it known that I, JULIUS F. GOETZ, a citizen of the United States, and resident of Hartford, in the county of Mason and State of Wisconsin, have invented new and useful Improvements in Lightning-Rods, of which the following is a description, reference being had to the accompanying drawings, which are a part of this specification.

The invention relates to lightning rods.

The invention is designed more particularly to provide an all metal detachable connection between branch sections of a lightning rod.

The invention is further designed to provide an all metal detachable connection for branch sections of lightning rods which may be used with equal facility on lightning rods of tubular or cable construction.

The invention is further designed to provide a connection for branch sections of a lightning rod comprising a flexible conductor member secured to one of the rods which is adapted to be bent over the other rod disposed at an angle to the first named rod and to have the ends, so bent over, securely clamped within the first named rod.

The invention is further designed to provide an all metal detachable connection for branch sections of lightning rods comprising a single piece of flexible metal which is secured at one side to a metal plug, and whose free end is adapted to be bent over to engage the other side of the metal plug to encircle one rod and whose ends are then detachably secured by the tubular extension of the other rod when the plug is secured into the socket in said rod.

The invention is further designed to provide a new and improved form of connector for branch sections.

The invention consists in the several features hereinafter set forth and more particularly defined by claims at the conclusion hereof.

In the drawings Figure 1 is a view of two branch sections of tubular rod showing the branch connector applied thereto; Fig. 2 is a section taken on the line 2—2 of Fig. 1; Fig. 3 is a section taken on the line 3—3 of Fig. 1; Fig. 4 is a view of the unassembled parts of the conductor and branch tubes, parts being shown in section; Fig. 5 is a view of two branch sections of cable conductor showing the connector applied thereto, parts being shown in section.

The connector for the branch sections of the rod comprises a flexible metal strip 6 which is adapted to be bent around one of the rods and means for securing and clamping the ends of said strip to the other rod. In the drawings the flexible conductor 6 is bent over and around the tubular rod 7, Fig. 1, and similarly bent over and around the cable 8 in Fig. 5, and means are provided in one instance for securing the ends of the strip 6 to the tubular branch 9 and in the other instance for securing the ends to the branch 10 of the cable conductor. The means for securing and clamping the ends of the flexible strip to the tubular branch 9 comprises a cylindrical plug 11 to which one end 12 of the strip 6 is connected by a rivet 13, said plug 11 having a shouldered portion 14 and a threaded extension 15 adjacent said portion which threaded extension is adapted to be detachably secured in a threaded socket 16 which is secured to the branch 9 by a rivet 17 passing through it and through the tubular conductor, the socket 16 being disposed within the tube at a distance to permit the end 18 of the tube to surround and inclose the plug 11 when the extension 15 is screwed into the socket 16. The end 12 of the flexible strip 6 is bent transversely to surround half the plug 11 and the free end 19 of the strip is bent into a semicircular channel so that when the flat portion 20 of the strip 6 is bent over the conductor 7, the end 19 may be brought around so that its semicircular channel registers with the other half of the plug 11 and the diameter of the plug increased by the width of the two ends 12 and 19 of the strip 6 secured thereto is such as to permit these members when held together to be slid into the extension 18 of the tube 9 so that the threaded member 15 may be screwed into the socket 16 with the result that the tube 9 not only serves to hold the socket to which the end of the plug is secured, but also to clamp the end of the strip within it and to secure the free end 19 to the plug after this end has been bent around the branch 7.

The construction shown in Fig. 5 in which the connector is employed on the branch sections of the cable is similar in all respects to that previously described with the exception of the means for securing it to the cable branch 10 which in this instance consists of a sleeve 21 which is secured to the cable by rivets 22 and has an extension 23 for receiving the shouldered end 24 of the socket 16 which socket is secured to the sleeve 21 and to an inclosing sleeve 25 by a rivet 26. The inclosing sleeve 25 serves the same purpose as the end 18 of the tubular rod shown in Fig. 3. The manner of securing the conductor to the cables is the same as that previously described. The invention thus exemplifies a metal connector consisting of a metal strip which is adapted to be bent around one branch of the rod and the ends of which are adapted to be detachably secured to the other branch rod to establish a circuit from one rod to the other.

The invention is not to be restricted to the details of construction herein set forth but may be varied so as to be within the scope of the appended claims.

What I claim as my invention is:—

1. The combination, with the branch sections of a lightning rod, one of said sections having a tubular end, of a flexible metal strip adapted to encircle the other section, and means for securing the ends of the strip within the tubular end of the first mentioned section.

2. The combination, with the branch sections of a lightning rod, one of said sections having a socket secured thereto at one end, of a flexible metal-strip adapted to encircle one section, means detachably secured to the socket and connected to one end of said strip, and means for securing the other end of the strip to the socket-carrying section.

3. The combination, with the branch sections of a lightning rod, one of said branch sections having a hollow end, of a flexible metal strip adapted to encircle one section, and means coacting with the hollow end of the other section to detachably secure and clamp the ends of the flexible strip to said section.

4. A branch-joint-connection for lightning rods comprising a flexible metal strip adapted to be bent around to encircle one of the rods, and means for securing and clamping the ends of the strip so bent within the other rod.

5. A branch-joint-connection for lightning rods comprising a flexible metal strip adapted to be bent around to encircle one of the rods, and means for detachably securing and clamping the ends of the strip so bent within the other rod.

6. The combination, with the branch sections of a lightning rod, one of said branch sections having a hollow end, of a flexible metal strip adapted to encircle one rod section, and a plug detachably secured within the hollow end of the other section and coacting with said hollow end to secure and clamp the ends of the flexible strip to said section.

7. The combination, with the branch sections of a lightning rod, one of said branch sections having a hollow end and a socket secured within the hollow end, of a flexible metal strip adapted to encircle one section, and a plug detachably secured to the socket within the hollow end of the other section and coacting with said hollow end to secure and clamp the ends of the flexible strip to said section.

8. The combination, with the branch conductor sections of a lightning rod, one of said sections having a tubular end, of a flexible metal strip adapted to encircle the other section, and means within the first mentioned section for securing the ends of the strip within said tubular end.

In testimony whereof, I affix my signature, in presence of two witnesses.

JULIUS F. GOETZ.

Witnesses:
 LOUIS O. FRENCH,
 EMILY SCHOWALTER.

Copies of this patent may be obtained for five cents each, by addressing the "Commissioner of Patents, Washington, D. C."